United States Patent
Luo

[19]

[11] Patent Number: 5,856,647
[45] Date of Patent: Jan. 5, 1999

[54] DRAG CUP FOR PLASMA ARC TORCH

[75] Inventor: Lifeng Luo, Solon, Ohio

[73] Assignee: The Lincoln Electric Company, Cleveland, Ohio

[21] Appl. No.: 819,575

[22] Filed: Mar. 14, 1997

[51] Int. Cl.$^6$ .................................................. B23K 10/00
[52] U.S. Cl. ............................. 219/121.5; 219/121.48; 219/75
[58] Field of Search ................ 219/121.48, 121.5, 219/121.39, 121.51, 74, 75; 313/231.31, 231.41

[56] References Cited

U.S. PATENT DOCUMENTS

| | | |
|---|---|---|
| 3,641,308 | 2/1972 | Couch . |
| 4,421,970 | 12/1983 | Couch . |
| 4,463,245 | 7/1984 | McNeil . |
| 4,521,666 | 6/1985 | Severance . |
| 4,777,343 | 10/1988 | Goodwin . |
| 4,861,962 | 8/1989 | Sanders . |
| 4,891,489 | 1/1990 | Bollinger et al. .................. 219/121.48 |
| 5,147,997 | 9/1992 | Haberman . |
| 5,393,952 | 2/1995 | Yamaguchi et al. ................. 219/121.5 |
| 5,591,357 | 1/1997 | Couch . |
| 5,747,767 | 5/1998 | Severance et al. ................. 219/121.5 |

FOREIGN PATENT DOCUMENTS 188276 10/1966 Russian Federation .

*Primary Examiner*—Mark H. Paschall
*Attorney, Agent, or Firm*—Vickers, Daniels & Young

[57] ABSTRACT

A drag cup for a plasma arc torch is mounted on a sleeve member of the torch tip having a conical outer surface portion converging toward the torch nozzle and electrode assembly. The drag cup includes a mounting end, a conical portion extending along the conical portion of the sleeve member, and an end radially spaced from and surrounding the torch nozzle and including an end wall spaced axially outwardly of the end of the nozzle and having an opening therethrough coaxial with the plasma jet outlet orifice in the nozzle. The opening through the end wall of the drag cup is 3 to 6 times the size of the nozzle orifice and is large enough to provide a shielding gas flow about the plasma jet without disturbing the jet and, at the same time is small enough to protect the nozzle against molten metal blow-back through the opening.

17 Claims, 4 Drawing Sheets

DRAG CUP FOR PLASMA ARC TORCH

BACKGROUND OF THE INVENTION

The present invention relates to the art of plasma arc torches and, more particularly, to improvements in connection with a drag cup for use with a plasma arc torch.

It is of course well known that a plasma arc torch comprises a nozzle receiving an electrode which has a nose end facing an end wall of the nozzle and which end wall has a plasma outlet opening therethrough. The electrode and nozzle may be relatively displaced between starting and operating positions in which the electrode respectively contacts the end wall and is spaced an operating distance therefrom. The end wall of the nozzle and the end face of the electrode provide a gas chamber into which a plasma gas is supplied and from which a plasma jet is emitted through the outlet orifice when an arc current is flowed between the electrode and nozzle. Upon starting the torch, by moving the electrode out of contact with the end wall to create a pilot arc, the torch operates in a non-transferred pilot arc mode and, when the nozzle is moved into proximity with a workpiece, the arc is transferred to the workpiece and the torch then operates in an arc-transferred mode. In an alternative structural arrangement, the electrode and nozzle can be fixed relative to one another and the torch started by the use of a high frequency or other known starting procedure.

Drag cups are used with hand held plasma arc torches and advantageously allow an operator to contact the torch assembly with a workpiece such as during a cutting operation, primarily to assist the operator in maintaining a correct standoff distance between the torch and workpiece. A drag cup also functions to protect against double arcing which occurs when the nozzle contacts the workpiece. Such drag cups are generally made from a ceramic material or a metal material, the latter being preferred due to easy breakage of ceramic materials. When a metal material is used, an insulating layer is provided between the torch nozzle and the drag cup so as to electrically isolate the drag cup from the nozzle. In either event, the drag cup is cooled by shielding gas flowing along the outside of the nozzle during operation of the torch. Drag cups heretofore provided have included a cylindrical skirt portion providing a relatively large diameter opening, often larger than the diameter of the nozzle and providing a large open area at the outer end of the drag cup. The shielding gas flows through the open area without disturbing the plasma jet which exits through the outlet opening in the end wall of the nozzle, and the primary disadvantage of this drag cup structure is that the nozzle is not protected from the blow-back of molten metal. Accordingly, metal builds up at the outer end of the nozzle and, ultimately, will short the nozzle to the workpiece and cause double arcing. Other drag cups heretofore available have included an end wall across the outer end of the cup and provided with a small opening axially aligned with the outlet opening from the nozzle for the plasma jet. The end wall blocks the blow-back of molten metal and the latter is blown away from the end of the drag cup by the shielding gas which flows through the central opening therein for the plasma arc and through a plurality of laterally outwardly directed bleed ports provided in the end wall about the central opening. The shielding gas flow through the central opening and through the vent passages must be smooth and, accordingly, drag cups having this structure are undesirably expensive to manufacture due to the drilling and deburring of the multiplicity of holes therethrough.

SUMMARY OF THE INVENTION

In accordance with the present invention, a drag cup structure is provided which advantageously minimizes or overcomes the foregoing and other problems attendant to the construction and use of drag cups heretofore available. More particularly in this respect, a drag cup structure in accordance with the present invention protects the torch nozzle from molten metal blow-back and provides an improved flow of shielding gas by which such protection is achieved without the need for bleed ports surrounding the central opening in the end wall of the drag cup. In accordance with one aspect of the invention, the drag cup has an end wall extending across the torch nozzle and provided with a central opening coaxial with and several times larger in diameter than the plasma jet orifice through the nozzle. Shielding gas flows along the nozzle and across the end thereof and thence through the central opening in the end wall of the drag cup about the plasma jet, whereby the end wall together with the flow of shielding gas through the central opening blocks the blow-back of molten metal and blows the latter away from the arc without the need of bleed ports, whereby the drag cup is economical to produce. The central opening is from about 3 to about 6 times larger than the diameter of the outlet opening in the nozzle for the plasma jet depending upon the total shielding gas flow. Moreover, the central opening is big enough for all of the shielding gas to flow therethrough without disturbing the plasma jet while at the same time, as mentioned above, preventing molten metal from blowing into the drag cup and promoting shorting of the nozzle. In accordance with another aspect of the invention, the structure of the drag cup accommodates the ready mounting and dismounting thereof on a torch tip.

It is accordingly an outstanding object of the present invention to provide an improved drag cup for use with a hand-operated plasma arc torch.

Another object is the provision of a drag cup for the latter purpose which optimizes protection against the blow-back of molten metal without affecting the plasma jet exiting from the torch nozzle and thus protects against double arcing.

Still another object is the provision of a drag cup of the foregoing character which optimizes cooling of the torch tip assembly and drag cup during operation of the torch.

Yet another object is the provision of a drag cup of the foregoing character which is structurally simple and economical to produce, which is readily mountable on and removable from a torch tip and which promotes a more efficient use and operation of a torch by optimizing cooling of the tip assembly and drag cup in conjunction with protection of the nozzle against double arcing.

BRIEF DESCRIPTION OF THE DRAWINGS

The foregoing objects, and others, will in part be obvious and in part pointed out more fully hereinafter in conjunction with the description of a preferred embodiment of the invention illustrated in the accompanying drawings in which.

DESCRIPTION OF A PREFERRED EMBODIMENT

Figure 1:
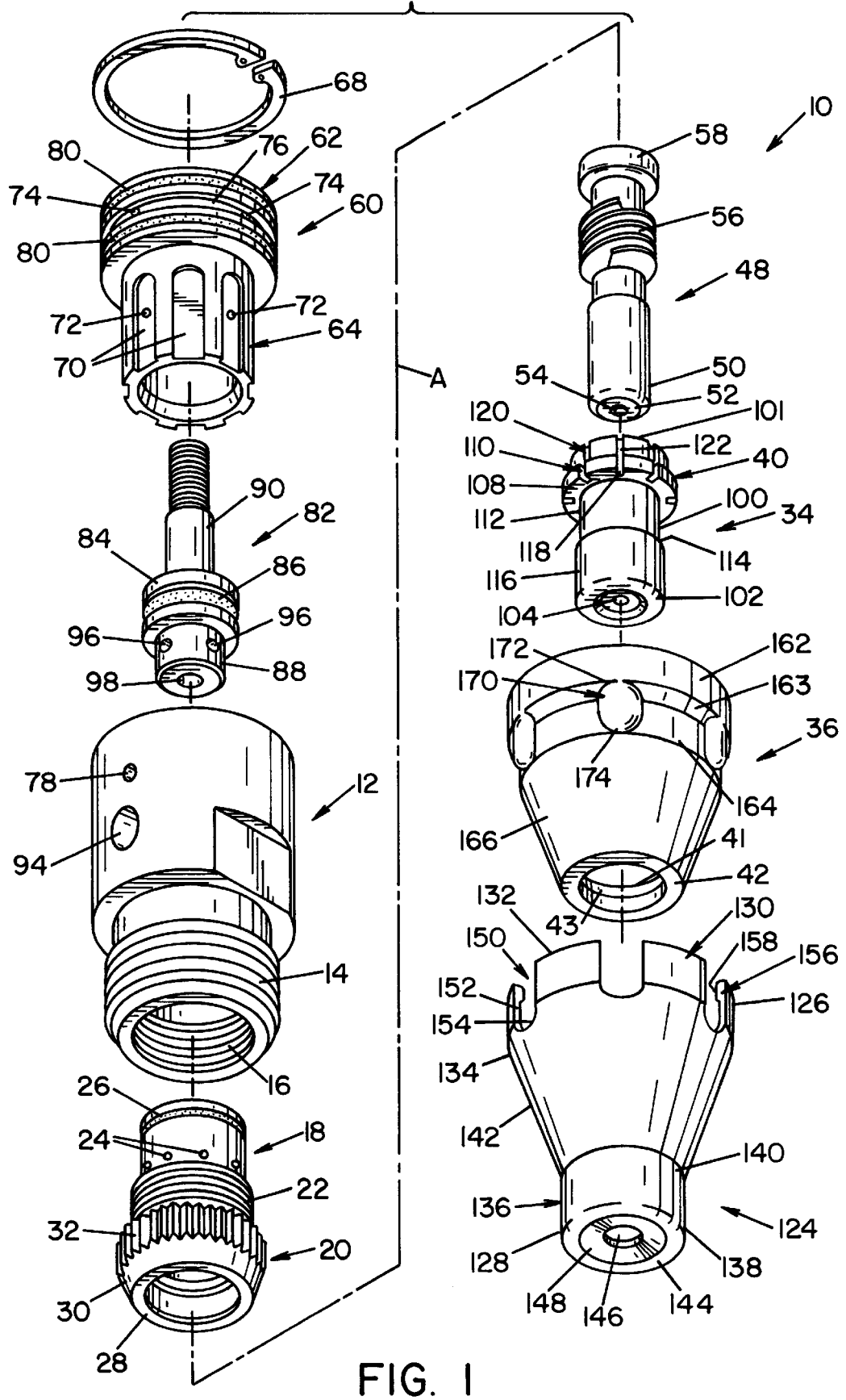
FIG. 1 is an exploded perspective view of the component parts of a plasma arc torch and drag cup in accordance with the present invention.

Referring now in greater detail to the drawings, wherein the showings are for the purpose of illustrating preferred embodiments of the invention only and not the purpose of limiting the invention, FIGS. 1 and 2 of the drawing illustrate a plasma arc torch 10 having an axis A and comprising a body portion 12 coaxial with axis A and supporting coaxially arranged nozzle, electrode and electrode displacing components as described in greater detail hereinafter. With regard to the vertical orientation of torch 10 shown in FIG. 2, body portion 12 has a lower end provided with outer and inner threads 14 and 16, respectively, and a swirl ring assembly comprising a sleeve of insulting material 18 and a mounting sleeve 20 are received in the lower end of body portion 12 and mounted thereon by external threads 22 on sleeve 20 interengaging with internal threads 16 on body portion 12. For the purposes which will be described or which will become apparent hereinafter, the inner end of insulating sleeve 18 is provided with a plurality of swirl ports 24 opening radially therethrough and an O-ring seal 26 in a recess extending about the periphery thereof, and the lower end of mounting sleeve 20 is provided with an end face 28 transverse to axis A, a conical wall 30 diverging relative to end face 28, and an outer surface extending axially upwardly from conical wall 30 and defined by a plurality of V-shaped fins 32 extending about the periphery of the mounting sleeve. A shoulder, not designated numerically, extends radially inwardly from the upper ends of fins 32 and engages against the lower end face of body portion 12 to position the swirling ring assembly therein.

A nozzle component 34 is mounted on the lower end of body portion 12 by a sleeve member or shield cup 36 having internal threads 38 on its upper end engaging with external threads 14 on body member 12. Nozzle member 34, which will be described in greater detail hereinafter, includes a mounting flange 40 extending thereabout intermediate the axially opposite ends thereof and which is axially captured between end face 28 of mounting sleeve 20 and a radially inwardly extending shoulder 41 provided by flange 42 at the lower end of sleeve 36. As best seen in FIG. 2, the inner side of sleeve 36 includes a conical surface 44 diverging from shoulder 42 to internal threads 38 and which is radially spaced from conical wall 30 and fins 32 of mounting sleeve 20 to provide a cavity 46 therewith for the purpose set forth hereinafter.

Torch 10 further includes an electrode 48 coaxially therewith and supported therein for axial displacement relative to nozzle 34. Electrode 48 includes a nose end 50 received in nozzle 34 and having a cylindrical outer surface terminating at its lower end in a nose end surface 52. The lower end of nose portion 50 includes an insert 54 of hafnium, zirconium, tungsten, or the like and which, as is well known, functions in conjunction with the nozzle to create a plasma arc in connection with operation of the torch. Electrode 48 is provided axially inwardly of nose portion 50 with a gas swirling portion defined by helical swirling grooves 56 and which swirling portion is received in sleeve 18 of the swirl ring assembly for grooves 56 to define swirl passageways therewith. The inner most end of electrode 48 is provided with a head 58, and the helical passageways between swirling grooves 56 and sleeve 18 have inlet ends spaced axially inwardly of head 58 and adjacent ports 24 through sleeve 18 and outlet ends spaced axially inwardly from nose portion 50 and adjacent the axially spaced apart ends of nozzle 34 and sleeve 18.

Torch 10 further includes a piston and cylinder arrangement by which electrode 48 is axially displaceable relative to torch body 12 and thus nozzle 34. More particularly in this respect, the upper end of torch body 12 receives and supports a cylinder component 60 including a head portion 62 adjacent the upper end of body 12 and a sleeve portion 64 extending axially downwardly therefrom and having a lower end axially overlapping the outer side of sleeve 18 of the swirl ring assembly. Head portion 62 engages in torch body 12 against a shoulder 66, and cylinder component 60 is axially retained in torch body 12 by a split ring 68. For the purposes which will become apparent hereinafter, the outer side of sleeve portion 64 of cylinder component 60 is provided with a plurality of axially extending recesses 70 circumferentially spaced apart about the periphery thereof, and a plurality of ports 72 extending radially through sleeve portion 64 from the bottoms of alternate ones of the recesses, although it will be appreciated that the latter ports could extend through the bottoms of all of the recesses. Also for the purposes which will become apparent hereinafter, head portion 62 of the cylinder component is provided with radially extending vent passages 74 opening into a peripheral vent passageway 76 which is vented to atmosphere through a port 78 in torch body 12, and these vent passages are axially between a pair of O-rings 80 received in corresponding recesses therefor in the outer periphery of head portion 62 for sealing interengagement with the inner surface of torch body 12 when the cylinder component is mounted therein.

The piston and cylinder assembly of torch 10 further includes a piston member 82 having a head 84 supporting an annular sealing ring 86, an axially inner end 88 and an axially outer end in the form of a stem 90. Piston 82 is received in and is axially reciprocable relative to cylinder component 60 and, in this respect, head 84 of the piston is received in sleeve portion 64 of the cylinder component with inner end 88 engaging axially inner end 58 of electrode 48. A compression spring 92 biases piston 82 downwardly from the position thereof shown in FIG. 2, and piston 82 is displaced to the position thereof shown in FIG. 2 by plasma gas under pressure introduced through inlet passageway 94 and flowing axially along recesses 70 and thence radially inwardly through ports 24 in sleeve 18 and against the underside of head 58 of the electrode. A portion of the gas entering inlet passageway 94 flows radially inwardly through ports 72 to ports 96 extending radially into stem 90 and then upwardly through axial passageway 98 in the stem. The flow of gas into inlet passageway 94 is controlled by a solenoid valve, not shown, and which may for example open in response to the torch operator depressing the torch trigger to start the torch. During displacement of piston 82 to the position shown in FIG. 2, air above piston head 84 is vented to atmosphere through the vent passageways 74, 76 and 78. When the operator releases the torch trigger, the solenoid valve closes, gas pressure is removed from inlet passageway 94, and spring 92 displaces piston 82 downwardly from the position shown in FIG. 2, thus displacing electrode 48 downwardly. Air beneath piston head 84 is always vented through radial ports 96 and axial passageway 98 and this advantageously provides for cooling the piston. During downward movement of piston 82, air is drawn into the space above piston head 84 through vent passageways 74, 76 and 78. During operation of the torch, as will become apparent hereinafter, plasma gas is continuously flowed through the torch body and between the nozzle and electrode components for cooling purposes and for establishing a plasma arc jet. As will be appreciated from the foregoing description, such cooling and work gas is introduced in torch body 12 through inlet passage 94 which opens radially through the torch body adjacent the upper ends of recesses 70 in sleeve portion 64 of cylinder member 60.

Nozzle component 34 is a tubular component having a cylindrical wall 100 coaxial with axis A, the upper end 101 of which is open to receive nose portion 50 of electrode 48 and the lower end of which is closed by an end wall 102 transverse to axis A and having a plasma arc outlet orifice 104 therethrough which is coaxial with axis A. Mounting flange 40 has axially opposite upper and lower sides 106 and 108, respectively, and an outer periphery which is provided with radially outwardly open recesses 110 equally spaced apart circumferentially thereabout. The outer surface of nozzle 34 between lower side 108 of flange 40 and the lowermost end of end wall 102 comprises coaxial, axially adjacent first cylindrical, conical and second cylindrical surface portions 112, 114 and 116, respectively, which extend sequentially from side 108 of flange 40 to the lowermost end of the nozzle. Surface portion 116 has a diameter greater than that of surface portion 112, and conical surface portion 114 accordingly diverges from the lower end of surface portion 112 to the upper end of surface portion 116. For the purpose which will be described in greater detail hereinafter, each of the recesses 110 across flange 40 has a radially inner end 118 spaced radially outwardly from first cylindrical surface portion 112, and the upper end of nozzle 34 between upper side 106 of flange 40 and upper end 101 of wall 100 is provided with a plurality of axially extending grooves 120. Grooves 120 correspond in number with recesses 110 and are radially and circumferentially aligned with a corresponding one of the recesses 110 and, accordingly, have radially inner ends 122 which are coplanar with inner ends 118 of recesses 110.

Figure 3:
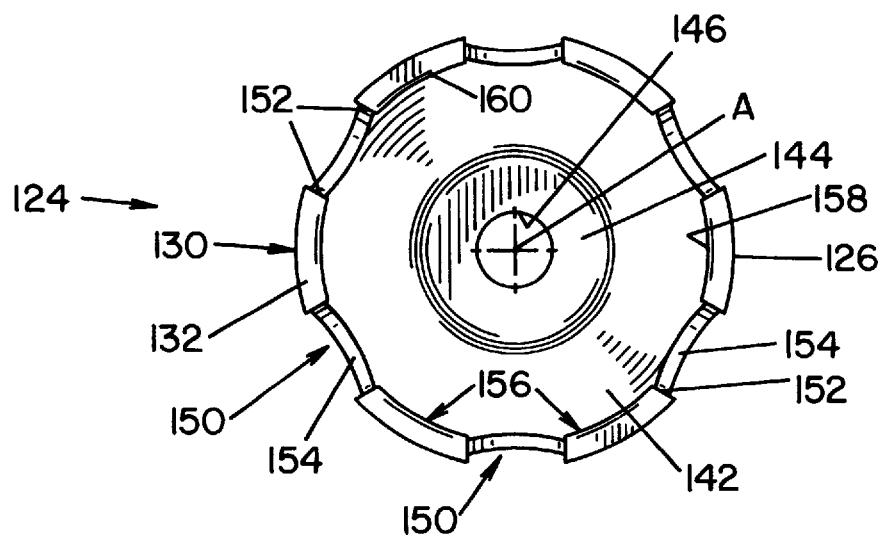
FIG. 3 is a plan view of the drag cup component.
Figure 4:
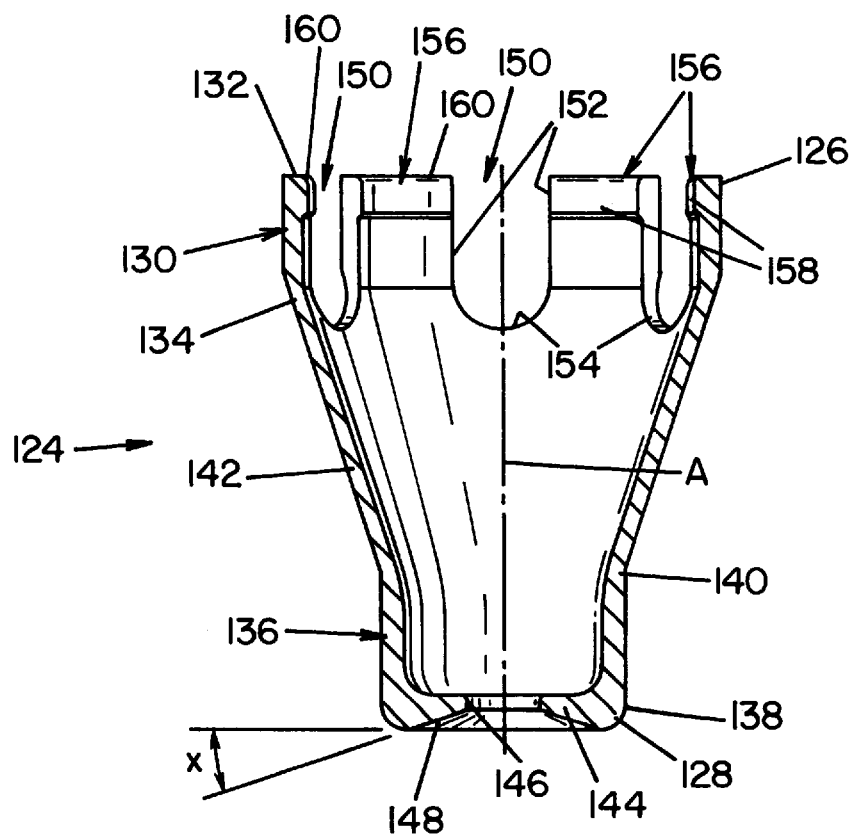
FIG. 4 is a sectional election view of the drag cup.

In accordance with the present invention, the torch tip is provided with a drag cup 124 which, in the preferred embodiment, is removably mounted on shield cup or sleeve member 36 of the torch tip coaxial with axis A. The structure of drag cup 124 is shown in FIGS. 3 and 4 of the drawing from which is will be seen that the drag cup comprises a body portion which is circular in cross section transverse to axis A and has axially opposite ends 126 and 128. End 126 of the body portion includes a circular wall portion 130 having an axially outer edge 132 and an axially inner end 134, and end 128 of the body portion includes an annular wall portion 136 which is smaller in diameter than wall portion 130 and has axially outer and inner ends 138 and 140, respectively. The body portion further includes an intermediate, conical wall portion 142 between inner ends 134 and 140 of wall portions 130 and 136 and which converges radially with respect to axis A in the direction from end 134 towards end 140. Drag cup 124 further includes an end wall 144 transverse to axis A at the axially outer end of wall 136. End wall 144 has an opening therethrough coaxial with axis A and including a circular portion 146 extending axially outwardly from the axially inner side of end wall 144 and having a diameter several times greater than that of outlet orifice 104 in nozzle member 34. The opening through end wall 144 further includes a conical surface portion 148 in the axially outer side of end wall 144 intersecting circular portion 146 about midway between the axially inner and outer sides of end wall 144 and diverging axially and radially outwardly therefrom at an angle x relative to a plane transverse to axis A and which, preferably, is about 18°. The purpose for surface 148 will become apparent hereinafter.

End 126 of the body portion of drag cup 124 is provided with a plurality of slots 150 equally spaced apart circumferentially about wall 130 and extending axially inwardly from edge 132 thereof. Each of the slots is defined by a pair of circumferentially spaced apart parallel side edges 152 extending axially inwardly from outer edge 132 and having inner ends, not designated numerically, at inner end 134 of wall 130. Each of the slots further includes an arcuate inner edge 154 between the inner ends of side edges 152 and extending axially therefrom into conical wall portion 142 of the drag cup. Circumferentially adjacent ones of the slots 150 provide end 126 of the body portion with a plurality of axially extending circumferentially spaced apart tabs 156. The drag cup is preferably made of copper or a copper alloy such as tellurium copper, and the radial thickness of the wall at the juncture between wall portions 130 and 142 is relatively thin, whereby tabs 156 are radially outwardly resilient for the purpose set forth hereinafter. It will be appreciated of course that each of the tabs 156 has circumferentially opposite sides defined by side edges 152 of circumferentially adjacent slots 150 and, preferably and for the purpose set forth more fully hereinafter, the radially inner side of each of the tabs is provided with a radially inwardly facing projection 158 extending axially inwardly from outer edge 132 of wall portion 130 and circumferentially between sides 152 of the tab. Preferably, the juncture 160 between each of the projections 158 and the corresponding portion of edge 132 of wall portion 130 is rounded for the purpose set forth hereinafter.

Figure 2:
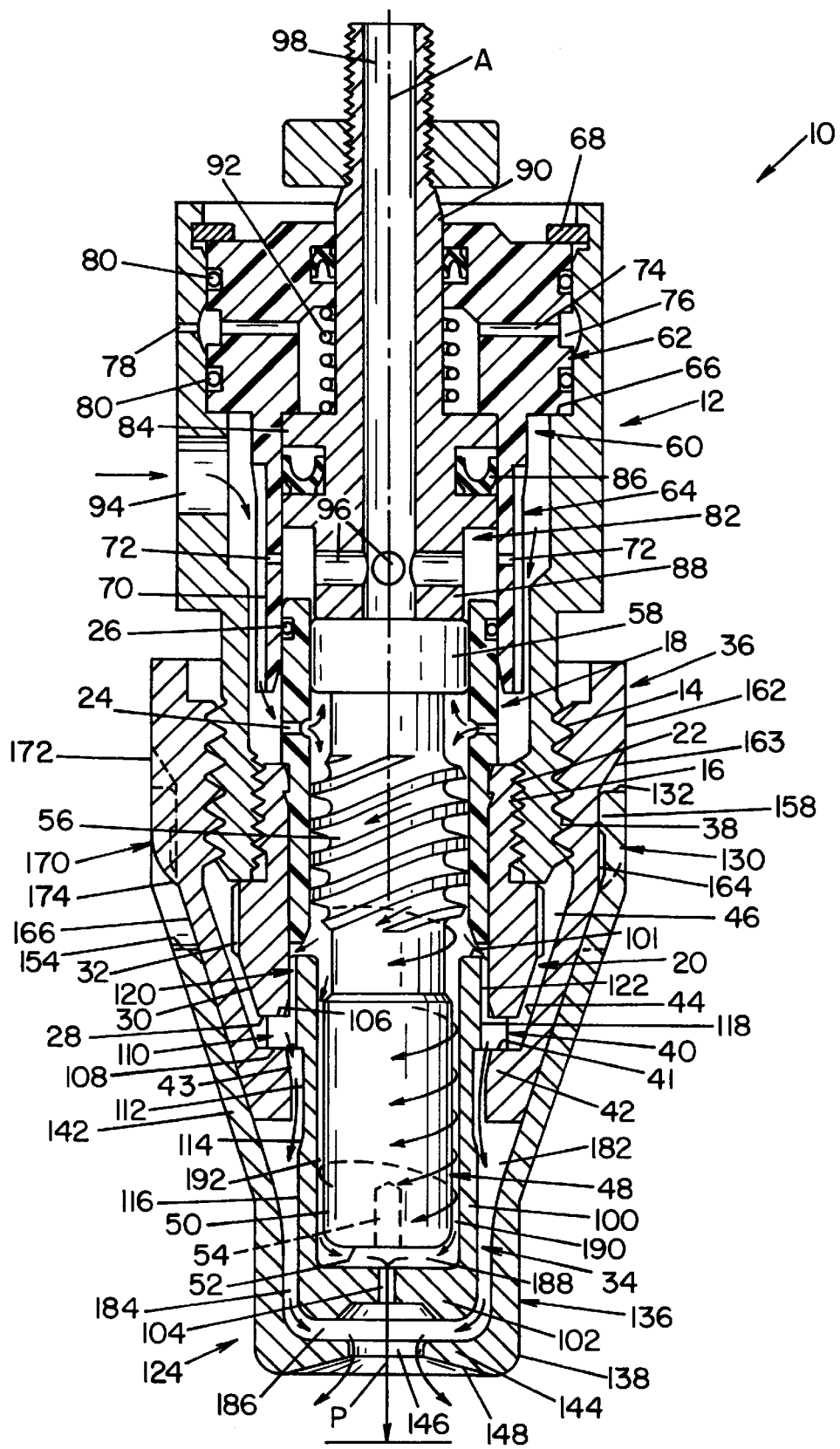
FIG. 2 is a sectional elevation view of the assembled component parts of the torch.
Figure 5:
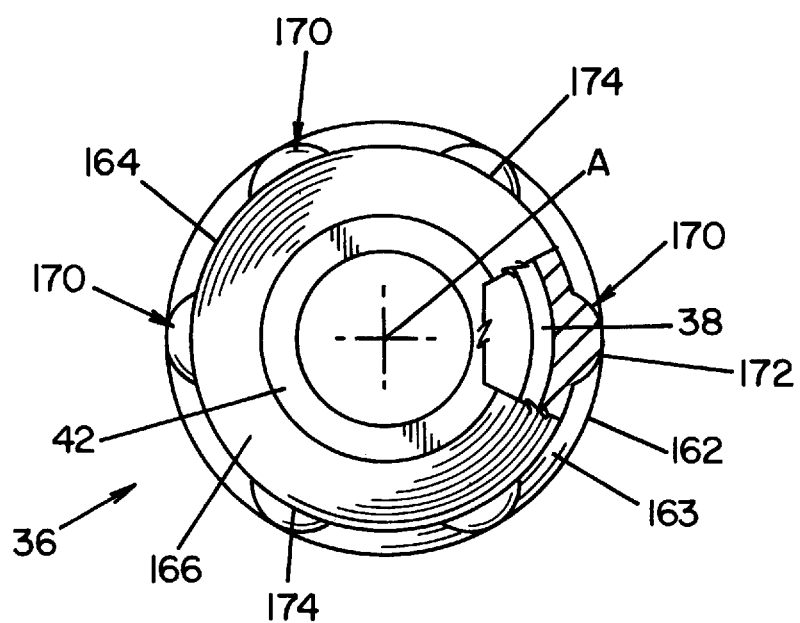
FIG. 5 is a front elevational view of the torch tip member on which the drag cup is mounted.

As mentioned above, drag cup 124 is removably mountable on shield or sleeve member 36 of the torch tip, and the structural interrelationship between the drag cup and torch tip when the drag cup is mounted thereon will be appreciated from the following description with reference to FIGS. 1, 2 and 5 of the drawing. In the embodiment illustrated, sleeve member 36 has a circular outer surface portion 162 at the axially inner end thereof, an outer surface portion 164 axially spaced from and stepped radially inwardly relative to surface portion 162, and a conical shoulder 163 therebetween. Sleeve 36 further includes a conical surface portion 166 converging from surface portion 164 toward the lower or axially outer end of the sleeve as defined by flange 42. Sleeve 36 further includes a plurality of radially outwardly extending projections 170 equally spaced circumferentially thereabout and corresponding in number to the number of slots 150 in drag cup 124. Each of the projections 170 has an axially inner end 172 at shoulder 163 and an arcuate axially outer end 174 at the juncture between surface portions 164 and 166. Projections 170 are circumferentially arcuate and have a circumferential width generally corresponding to the circumferential width of slots 150, and adjacent ones of the projections are circumferentially spaced apart by a circumferential dimension generally corresponding to that of tabs 156 of the drag cup. The drag cup is removably mounted on sleeve member 36 by moving end 126 of the drag cup axially onto sleeve member 36 in the direction from end 42 toward surface portion 164 and with slots 150 circumferentially aligned with projections 170. When projections 158 on tabs 156 engage conical surface 166 adjacent the juncture thereof with surface portion 164, rounded edges 160 on the tabs cam the tabs radially outwardly for the projections to engage an axially slide along surface portion 164 until the inner surface of conical wall 142 of the drag cup seats against conical outer surface 166 of sleeve 36. When so mounted, slots 150 axially receive projections 170 and interengage therewith to restrain relative rotation between the torch tip and drag cup.

As best seen in FIG. 2, when drag cup 124 is mounted on sleeve member 36 in the foregoing manner, the lower end of conical wall portion 142 of the drag cup is radially outwardly spaced from the outer surface of nozzle 34 beneath flange 42 of sleeve member 36 to provide a shielding gas chamber 182 extending about the nozzle member and, as will be described in detail hereinafter, a portion of the shielding gas flow through the torch tip flows into the latter chamber in conjunction with operation of the torch and for the purpose will be described in connection with such operation. As will be further appreciated from FIG. 2, when drag cup 124 is mounted on sleeve member 36 annular wall portion 136 of the drag cup surrounds and is radially outwardly spaced from the lower end of nozzle 34 to provide an annular passageway 184 therebetween, and the inner side of end wall 144 of the drag cup is spaced axially outer side of end wall 102 of nozzle 34 to provide a radially inwardly extending passageway 186 therebetween. As will also be appreciated from FIG. 2, when drag cup 124 is mounted on sleeve member 36 the lower end 138 of wall portion 136 and end wall 144 are positioned axially outwardly from the axially outer side of end wall 102 of nozzle 34 and are thus positioned to engage a workpiece and to space nozzle 34 a suitable standoff distance therefrom.

Referring now to FIG. 2 in connection with the foregoing description and with respect to operation of the torch, nose portion 50 of electrode 48 is shown in its operating position spaced upwardly from end wall 102 of nozzle 34. As described hereinabove, prior to starting the torch nose portion 50 of the electrode engages end wall 102 of nozzle 34 under the bias of spring 92 and is displaced from the latter position to the operating position shown in FIG. 2 by introducing plasma gas under pressure through passageway 94, recesses 70 and ports 24 to the underside of head 58 of electrode 48. As is well known, the electrode and nozzle are adapted to be connected across a source of arc current whereby, when electrode 48 is displaced from its position contacting nozzle 34 to the position shown in FIG. 2, a pilot arc is generated therebetween. In connection with such starting and operation of the torch in the embodiment illustrated, the area between lower and face 52 of nose portion 50 of electrode 48 and the axially inner surface of end wall 102 of nozzle 34 provides a plasma gas chamber 188 having an annular entrance 190 from an annular passage 192 defined by the annular space between the inner surface of nozzle 34 from end 101 thereof and the outer surface of nose portion 50 of the electrode. Prior to creating the pilot arc, plasma gas is introduced through inlet passage 94 in torch body 12 for flow in the annular space between the torch body and cylinder sleeve 64, axially along recesses 70 therein toward swirl ports 24 in sleeve component 18 of the swirl ring assembly and then radially inwardly through ports 18. The plasma gas then flows downwardly about the upper end of electrode 48 along swirl passages 56 to the lower end of sleeve 18. At the lower end of sleeve 18 which is axially spaced from end 101 of nozzle 34, a part of the gas flows in a swirling pattern in the annular passage 192 and thence into gas chamber 188 from peripheral entrance 190. When the electrode is then displaced relative to the nozzle to generate a pilot arc, outlet orifice 104 is uncovered and a plasma jet P exits through the outlet opening. As will be further appreciated from FIG. 2, a portion of the plasma gas flowing through swirl ports 24 and thence along helical swirl passages 56 to the exit ends thereof flows laterally outwardly across upper end 101 of nozzle 34 and thence axially through grooves 120 in the outer surface of the nozzle to and axially across recesses 110 in mounting flange 40 of the nozzle. Furthermore, a portion of the plasma gas flowing through grooves 120 flows radially outwardly from recesses 110 into the annular space between surfaces 30 and 44 of mounting rings 20 and 36 and into cavity 46 across cooling fins 32, thus to promote cooling of the component parts of the torch in this area. The portion of the plasma gas flowing axially across recesses 110 in flange 40 is deflected radially inwardly against first cylindrical surface 112 of nozzle 34 by a conical wall portion 43 extending downwardly from shoulder 41 on sleeve member 36 in converging relationship with surface portion 112. As the gas flows axially along the latter surface portion, it impinges upon conical surface portion 114 and is deflected radially outwardly therefrom into shield gas chamber 182 for flow axially into passageway 184 and thence radially inwardly along passageway 186 to opening 146 in end wall 144 of drag cup 124. The shielding gas then flows axially outwardly through opening 146 about plasma jet P and is influenced by conical wall portion 148 of the opening to deflect radially outwardly relative to axis A so as to blow molten metal radially outwardly of the torch tip. The diameter of opening 146 is sufficiently large relative to the diameter of outlet opening 104 in the nozzle to preclude the flow of shield gas through opening 146 from laterally distorting plasma jet P. At the same time, the size of opening 146, together with the influence of conical surface 148, promotes blocking molten metal blow-back through opening 146 and against the nozzle. In addition to providing the foregoing advantages in connection with protecting the torch nozzle from molten metal blow-back and the potential of double arcing, the flow of plasma gas between collar members 20 and 36 and into cavity 46 therebetween and the flow into and through chamber 182 and passageways 184 and 186 optimizes cooling of the component parts of the torch tip assembly.

As mentioned hereinabove, the size of opening 146 in drag cup end wall 144 relative to the size of outlet opening 104 in end wall 102 of nozzle 34 is important in connection with obtaining the desired cooling in the torch tip assembly together with protection of the nozzle against molten metal blow-back and double arcing. In the embodiment illustrated and described herein, the outer diameter of nozzle 34 at end wall 102, as defined by outer surface portion 116, is about 0.440 inch, the diameter of outlet orifice 104 in wall 102 is about 0.042 inch and the diameter of opening 146 through end wall 144 of the drag cup is about 0.188 inch. This provides an orifice to cup opening ratio of about 1 to 4.5. With further regard to the disclosed embodiment, the total gas flow through the torch tip during operation of the torch is about 240 ft.$^3$/hr., and the structure of the tip assembly provides for about ⅓ of the gas flow to be through passageway 192 and chamber 188 between the electrode and nozzle, and for about ⅔ of the gas flow to be into chamber 182 and passageways 184 and 186 between the nozzle and drag cup. While the foregoing gas flow is preferred, and the foregoing ratio in conjunction therewith provides the desired results with respect to obtaining a shielding gas flow without disturbing the plasma jet and protecting against molten metal blow-back, the nozzle orifice diameter is a variable as is the total gas flow which can vary from about 100 ft.$^3$/hr. to about 360 ft.$^3$/hr. Assuming such gas flow variation to take place in a torch tip assembly in which the nozzle outlet opening is the same as that of the preferred embodiment, namely 0.042 inch, the desired results with respect to the flow of plasma gas through drag cup opening 146 about the plasma jet would have a diameter of about 0.125 inch in connection with the lower gas flow rate and a diameter of about 0.250 inch in connection with the higher gas flow rate. Accordingly, it will be appreciated that these dimensions respectively provide a ratio between the nozzle orifice and the drag cup opening of about 1 to 3 and about 1 to 6. Importantly in accordance with the present invention, the drag cup has an end wall with a single opening which is smaller than the outer diameter of the nozzle, larger than the outlet orifice in the nozzle, large enough to allow gas flow therethrough about the plasma jet without distorting the latter and, at the same time, small enough to protect the nozzle from molten metal blow-back. From the description herein, it will be appreciated that these desired results can be obtained with a variety of nozzle orifice to drag cup opening ratios in conjunction with a variety of different total gas flow rates.

While considerable emphasis has been placed herein on the structures and structural interrelationships between the component parts of the preferred embodiment, it will be appreciated that other embodiments can be made and that changes can be made in the preferred embodiment in addition to the modifications referred to hereinabove without departing from the principals of the invention. In particular, it will be appreciated that arrangements other than the tabs and slots at the axially inner end of the drag cup can be employed for mounting the cup on the torch tip. It will likewise be appreciated that the drag cup can be used with torch tip assemblies having structures and operating characteristics other than those disclosed herein including, for example, an assembly in which the electrode and nozzle components are fixed in axially spaced apart relationship as opposed to being displaceable relative to one another and, in connection with the latter, arrangements in which the electrode and nozzle are relatively displaceable other than by the piston and cylinder arrangement disclosed herein. Still further, it will be appreciated that the torch tip assembly can include an internal shielding gas flow arrangement or arrangements different from that disclosed herein. Still further, while the slot and tab arrangement for mounting the drag cup preferably includes six tabs and slots, it will be appreciated that arrangements providing either fewer or more as well as differently configured tabs and slots can be employed. These and other changes of the preferred embodiment as well as other embodiments of the invention will be apparent to those skilled in the art from the disclosure herein, whereby it is to be distinctly understood that the foregoing descriptive matter is to be interpreted merely as illustrative of the invention and not as a limitation.

Having thus described the invention, it is claimed:

1. A drag cup for a plasma torch tip assembly including a nozzle having an axis and a cylindrical wall portion having an outer diameter, a nozzle end wall transverse to said axis and a plasma jet outlet orifice through said nozzle end wall coaxial with said axis and having a diameter less than said outer diameter, said drag cup comprising a body portion having axially opposite ends, one of said ends including an annular wall portion for mounting said cup on said tip assembly, a cup end wall at the other end of said body portion transverse to said axis and axially spaced from said nozzle end wall when said drag cup is mounted on said tip assembly, said cup end wall having just one opening therethrough coaxial with said axis and having a diameter larger than said diameter of said orifice and smaller than said outer diameter of said nozzle, said tip assembly including a sleeve member having an axially extending outer surface portion, and said annular wall portion including a plurality of axially extending resilient tabs circumferentially spaced apart about said axis and engaging said axially extending outer surface portion of said sleeve member for releasably mounting said drag cup on said tip assembly.

2. A drag cup according to claim 1, wherein said sleeve member includes projections extending radially outwardly of said outer surface portion of said sleeve member, said projections being received in the spaces between circumferentially adjacent ones of said tabs and interengaging therewith to restrain relative rotation between said drag cup and tip assembly about said axis.

3. A drag cup for a plasma torch tip assembly including a nozzle having an axis and a cylindrical wall portion having an outer diameter, a nozzle end wall transverse to said axis and a plasma jet outlet orifice through said nozzle end wall coaxial with said axis and having a diameter less than said outer diameter said drag cup comprising a body portion having axially opposite ends, means at one of said ends including an annular wall portion for mounting said cup on said tip assembly, a cup end wall at the other end of said body portion transverse to said axis and axially spaced from said nozzle end wall when said drag cup is mounted on said tip assembly, said cup end wall having just one opening therethrough coaxial with said axis and having a diameter larger than said diameter of said orifice and smaller than said outer diameter of said nozzle, said cup end wall having axially inner and outer sides, and said opening therethrough including a conically recessed portion on said outer side diverging at an acute angle in the direction from said inner toward said outer side.

4. A drag cup according to claim 3, wherein said body portion is circular in cross section transverse to said axis, said one end includes a first annular wall portion having a first diameter, said other end includes a second annular wall portion having a second diameter smaller than said first diameter, said second annular wall portion surrounding said cylindrical wall portion of said nozzle in radially outwardly spaced relationship thereto, and said body portion including an intermediate wall portion between said first and second wall portions.

5. A drag cup according to claim 4, wherein said first and second annular wall portions are axially spaced apart and said intermediate wall portion is conical and converges in the direction from said first toward said second wall portion.

6. A drag cup according to claim 5, wherein said torch tip assembly includes a sleeve member having an axially extending annular outer surface portion and a conical outer surface portion respectively radially underlying said first annular wall portion and said conical intermediate wall portion of said body portion when said cup is mounted on said torch tip assembly.

7. A drag cup according to claim 6, wherein said first annular wall portion includes a plurality of axially extending resilient tabs circumferentially spaced apart about said axis and engaging said axially extending outer surface portion of said sleeve member for releasably mounting said drag cup on said tip assembly.

8. A drag cup according to claim 7, wherein said sleeve member includes projections extending radially outwardly of said outer surface portion of said sleeve member, said projections being received in the spaces between circumferentially adjacent ones of said tabs and interengaging therewith to restrain relative rotation between said drag cup and tip assembly about said axis.

9. A drag cup according to claim 8, wherein said cup end wall has axially inner and outer sides and said opening therethrough includes a conically recessed portion on said outer side diverging in the direction from said inner toward said outer side.

10. A drag cup according to claim 3, wherein said diameter of said opening through said cup end wall is at least about three times larger than said diameter of said orifice.

11. A drag cup according to claim 3, wherein said diameter of said opening through said cup end wall is between about three to six times larger than said diameter of said orifice.

12. A drag cup according to claim 11, wherein said diameter of said opening through said cup end wall is about 4.5 times greater than said diameter of said orifice.

13. A drag cup according to claim 12, wherein said cup end wall has axially inner and outer sides and said opening therethrough includes a conically recessed portion on said outer side diverging in the direction from said inner toward said outer side.

14. A drag cup according to claim 13, wherein said conically recess portion diverges at an angle of about 18° relative to a plane transverse to said axis.

15. A drag cup according to claim 12, wherein said body portion is circular in cross section transverse to said axis, said one end includes a first annular wall portion having a first diameter, said other end includes a second annular wall portion having a second diameter smaller than said first diameter, said second annular wall portion surrounding said cylindrical wall portion of said nozzle in radially outwardly spaced relationship thereto, and said body portion including an intermediate wall portion between said first and second wall portions and wherein said first and second annular wall portions are axially spaced apart and said intermediate wall portion is conical and converges in the direction from said first toward said second wall portion and wherein said torch tip assembly includes a sleeve member having an axially extending annular outer surface portion and a conical outer surface portion respectively radially underlying said first annular wall portion and said conical intermediate wall portion of said body portion when said cup is mounted on said torch tip assembly.

16. A drag cup according to claim 15, wherein said first annular wall portion includes a plurality of axially extending resilient tabs circumferentially spaced apart about said axis and engaging said axially extending outer surface portion of said sleeve member for releasably mounting said drag cup on said tip assembly and wherein said sleeve member includes projections extending radially outwardly of said outer surface portion of said sleeve member, said projections being received in the spaces between circumferentially adjacent ones of said tabs and interengaging therewith to restrain relative rotation between said drag cup and tip assembly about said axis.

17. A drag cup according to claim 16, wherein said cup end wall has axially inner and outer sides and said opening therethrough includes a conically recessed portion on said outer side diverging in the direction from said inner toward said outer side and wherein said conically recess portion diverges at an angle of about 18° relative to a plane transverse to said axis.

* * * * *